United States Patent [19]

Huckfeldt

[11] 4,036,037

[45] July 19, 1977

[54] KNITTED TEXTILE CASING FOR SAUSAGES

[76] Inventor: Gebhard R. Huckfeldt, Oestmannstreppe 1, 2000 Hamburg 55, Germany

[21] Appl. No.: 595,803

[22] Filed: July 14, 1975

[30] Foreign Application Priority Data

July 13, 1974 Germany ............................. 2433751

[51] Int. Cl.² ............................................. A22C 13/00
[52] U.S. Cl. ......................................... 66/170; 66/190; 17/33
[58] Field of Search ................. 66/190, 171, 170, 9 R, 66/192, 193; 99/494; 17/33

[56] References Cited

U.S. PATENT DOCUMENTS

| 567,308 | 9/1896 | Esty | 66/190 |
|---|---|---|---|
| 1,972,755 | 9/1934 | Blaisdell | 66/190 X |
| 1,976,885 | 10/1934 | Levin | 66/190 |
| 2,222,522 | 11/1940 | Webster | 66/190 |
| 2,403,652 | 7/1946 | Fullerton et al. | 66/190 |
| 2,445,231 | 7/1948 | McDermott | 66/190 X |
| 2,459,688 | 1/1949 | DeVyver | 66/190 |
| 2,755,535 | 7/1956 | Schoenberger | 66/190 |
| 3,178,910 | 4/1965 | Hammerle | 66/170 |
| 3,248,905 | 5/1966 | Krauss et al. | 66/192 |
| 3,251,201 | 5/1966 | Newman | 66/192 |
| 3,513,668 | 5/1970 | Mintz | 66/193 |
| Re. 19,551 | 4/1935 | Meiwald | 66/190 |

FOREIGN PATENT DOCUMENTS

| 1,809,869 | 8/1969 | Germany | 66/193 |
|---|---|---|---|
| 1,101,117 | 3/1961 | Germany | 66/170 |
| 2,047,566 | 4/1971 | Germany | 66/190 |
| 241,952 | 12/1974 | Germany | 66/190 UX |
| 1,183,890 | 3/1970 | United Kingdom | 66/193 |
| 269,731 | 5/1971 | U.S.S.R. | 17/33 |

*Primary Examiner*—Mervin Stein
*Assistant Examiner*—Andrew M. Falik
*Attorney, Agent, or Firm*—Prutzman, Hayes, Kalb & Chilton

[57] ABSTRACT

A knitted textile casing for sausages having an additional yarn running predominantly in the circumferential direction of the casing about the sausage to limit the circumferential expandability of the knitted casing.

6 Claims, 4 Drawing Figures

KNITTED TEXTILE CASING FOR SAUSAGES

BRIEF SUMMARY OF THE INVENTION

The present invention relates generally to casings for sausages and the like and more particularly to a new and improved knitted textile casing.

It is a primary object of the present invention to provide a new and improved knitted textile casing for sausages and the like which provides for limiting circumferential expansion of the sausage and yet facilitates removal of the casing from the sausage.

It is another object of the present invention to provide a new and improved knitted textile casing for sausages and the like which may be coated or impregnated as desired.

Other objects will be in part obvious and in part pointed out more in detail hereinafter.

A better understanding of the invention will be obtained from the following detailed description and the accompanying drawing of illustrative applications of the invention.

DESCRIPTION OF THE PREFERRED EMBODIMENTS

Figure 1:
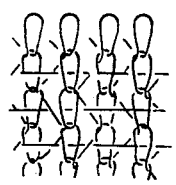
FIGS. 1-4 are enlarged plan views, partly broken away, of four embodiments of knitted textile casing material of the present invention.

While protection of the sausage and its ability to mature mainly depend on the casings' porosity, coating or impregnation, the mechanical qualities of the sausage casing will be determined preponderantly by the kind of textile surface material used as the casing frame. Textile sausage casings which are commercially marketed consist nearly exclusively of woven material. Although the use of knitted material has been proposed, it has not been commercially successful because of its disadvantages in comparison to woven casing material. For example, knitted material could not provide the required form rigidity for a sausage casing which is necessary for retaining a relatively constant sausage diameter, unless large quantities of material are used and such large quantities of material would be uneconomical and additionally would create permanent creases during and after the sausage maturing process.

Also, knitted material is very difficult to tear, and easy tearing of the casing in the direction of the circumference of the sausage casing is desirable for pulling off the casing from a section of the sausage, for example, for facilitating slicing the sausage. Such tearing is very difficult with conventional knitted goods and is therefore a disadvantage of such knitted goods as a sausage casing.

Finally, knitted goods, as a basis for sausage casings, have the disadvantage that they can be combined only with extremely expansible coating or impregnation material. For that purpose, only synthetic products (for example as disclosed in German patent DT-As 1,101,117) are apt but in some cases might prove to hinder a thorough maturing process of the sausage by reason of its insufficient permeability of water vapor. The coating materials, produced out of organic cellular material or fiber ( e.g. collagen), though having good maturing qualities, cannot be used because they have substantially less flexibility than conventional knitted goods, thereby, causing a tearing off or separation of the coating material from the knitted material. For that reason, usually casings with woven frames will be utilized with that kind of coating material. On the other hand, such woven casings have the disadvantage of higher production costs and at the same time they require more expensive fiber material (especially natural silk). Also, because of their lower strength, they permit only a restricted use with modern sausage machines and closing devices.

The proposition of the present invention is in creating casings for sausages of knitted surface material which, in spite of being knitted goods, provide form rigidity while retaining their elasticity.

Furtheron, the sausage casing of knitted material will permit the circumferential tearing of the casing while separating it from the sausage. It will also allow long proven suitable coating materials to be applied.

The solution according to the present invention is established by adding to the knitted goods, besides the knitting yarn, a special yarn. This special yarn is running predominantly in the circumferential direction of the casing and will be called in the following description as weft thread, for reasons of understanding and simplification.

The yarn running in the circumferential direction limits the expandability of the knitted casing material in such direction. When there is an excessive interior pressure, the thus equipped knitted material acts similar to tubular woven textures — at least in the circumferential direction — because the added weft threads receive the major part of the circumferential forces. Accordingly, the sausage casings, produced according to the invention, will have an equal or higher stability in diameter than those sausage casings which are based on woven material.

The weft thread influences the fibers of the knitted course in which it is running in the same way as a ripping or severance yarn would in circumferential direction. Since preponderantly each knitted course will have a weft thread, the above-mentioned effect will appear at any given place along the casing, where it is desired to tear off the casing. The threads of the knitted course can be destroyed or severed by the added weft threads since the knitted course threads surrounding the rip or weft thread cannot slip by the rip or weft thread, thus avoiding any difficulty for the ripping off.

Also, the weft thread protects the casing frame against an overstretching in the circumferential direction at the sausage machine and renders it possible that those coating and impregnation materials can be utilized which might allow only a limited stretching.

Further advantages of the knitted casing produced in accordance with the invention result from the fact that the coating and impregnation as well as the textile material are connected in a form-locking manner. Detachment of the coating from the frame is not to be expected, at least less than for instance a woven material basis is used. This quality allows utilization of less expensive yarns with a smooth surface for the production of the knitted goods, for instance synthetic yarns, although that might not be a condition.

Yarns made of synthetic material can also be chosen for the weft threads.

The expandability of the sausage casings and its elasticity in the circumferential direction can be adjusted by choosing the weft thread with regard to material and yarn count.

The type of the knitted material is not of important concern to the invention. However, it is preferable to use a material that is produced on circular knitting machines; for instance, a tubular purl fabric with a tied-in weft thread might be utilized. It is also possible to tie-in the weft thread into the loops as floating stitches and, otherwise, alternating tying in in one or the other loop by means of a kind of hook. Said hooks should be formed predominantly on each second or third loop.

In some cases such type of knitting goods might be sufficient in which different threads might partially float and partially take part in forming the loop; wherein the floating parts of the threads will be touching each other. (Handbuch der Textilwaren, VIB, Fachbuch-Verlag, Leipzig 1972, pages 186 and 187). Another procedure for the production of material which contains an appropriate weft thread is described, for instance in "C. Aberle: Die Wirk- und Strickmaschinen, Dr. Spohr-Verlag, Wuppertal 1951, page 90". In this case the weft thread is tied-up in the loops which are running in the direction of the warps without forming by itself loops or stitches.

Preferably those known weft thread connections will be utilized which prevent or make it difficult that ladders might develop.

The weft thread should run preferably in a straight line in the circumferential direction in the finished sausage casing, so that the length of the circumference of the weft thread will definitely determine the diameter and primarily the elasticity of the casing in circumferential direction. A deviation of the circumferential direction does not interfere as long as the expandability of the weft thread does not exceed the expandability of the coating material and as long as the desired tolerances of the diameter can be maintained. Preferably the weft thread is led in an angle of not more than 30° in relation to the circumferential direction, but even better not more than 20°. It will be preferable to lead the weft thread nearly straight in the circumferential direction, i.e. with an average inclination of not more than 10° in relation to the circumferential direction.

It is also preferable that all weft threads, running around the circumference have the same inclination. In such a case all weft threads could be lying parallel in the same angle in relation to the circumferential direction. But it is also possible to put some of the weft threads running a little inclined in relation to the circumferential direction and some other threads in an opposite inclination, always in relation to the circumferential direction. In the preferred type, all weft threads approach as much as possible the circumferential direction while (regarding a small number of loops) the threads appear to run in zig-zag.

The size of the loops (distance of the threads) can be chosen as in known with woven casing material. The open surface of a loop should be generally between 0.2 and 2.0 square millimeters and preferably between 0.3 and 1.2 square millimeters, the weft threads not being considered. An especially favorable value will be around 0.7 mm multiplied by 0.7 mm. This value indicates that the loops will form squares which have the mentioned measure, as soon as the material has been stretched in such a way that the loops form regular squares.

Appropriately the loops should be formed by yarn with a yarn count of 15 to 50, preferably 20 to 30 deniers. The weft thread should have a yarn count granting the desired relation of expandability and elastcity. In comparison with the loop threads, the weft threads should appropriately have an equal or higher yarn count. Preferably the value will be equal to or up to the double the denier value of the loop threads.

Thus the weight per surface unit will reach 5 to 25 grammes per square meter, in particular about 10 grammes per square meter for the uncoated material.

If collagen is used as a coating material, the surface weight of the coating material (dry) will be appropriately between 10 and 40 grammes per square meter and preferably in between 20 and 30 grammes per square meter. That will result in a total weight of the coated material in a preferred range of 30 to 40 grammes per square meter.

Sausage casings on knitted basis produced according to the present invention have the advantage that the ends of the sausages can be formed free of any creases. It is to be pointed out that in the sausage end the threads of the knitted goods will be lying densely together and forming in this way a very high resistance against any forces in the longitudinal direction of the casings. Those forces appear in modern sausage machines and closing devices.

At the same time sausage casing product according to the invention has the advantage of sausage casings on woven material basis. This advantage consists, in the first place, in maintaining the diameter of the casing. Furthermore, it provides for limiting the elastic expansion in the circumferential direction, thus protecting the coating while the casing is stuffed, and at the same time create an elasticity which can adapt itself to the shrinkage of the sausage as necessary and adequate. The sausage casings according to the invention show a good locking between the coating and the knitted goods without need to utilize expensive fiber materials.

Strength and expandability in the direction of the circumference and also in the longitudinal direction could be adjusted independently.

The material for the coating can be freely chosen. It is for this reason that the casing according to the present invention can be utilized in an excellent way with sausage meat which requires maturing and where it is undersirable for any sausage fat to penetrate the casing the reaching the outside of the same, i.e. for dry and semi-dry sausages. The sausage casing according to the invention be torn from the sausage easily, since in spite of its circumferential strength the casing can easily be torn in the direction of the circumference while in the other direction it retains good strength and expandability.

Since circular knitted tubes can be utilized, the sausage casings according to the invention have the advantages, as in longitudinal direction, of seamless casings.

Contrary to the woven casings, the sausge casings according to the invention can be utilized in ring form, in a way that on the circumference different widths of the loops will be chosen (for instance by an uneven distribution of the needles on the needle cylinder and/or by uneven stretching of the yarn in relation to the circumference of the needle cylinder).

The drawing shows the way of forming four types of knitted sausage casing material according to the present invention which demonstrate :

FIG. 1 warp knitted fabric with additional tied-in weft threads

Figure 2:
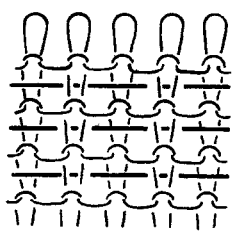

FIG. 2 purl fabric with additional threads running in each knitted course

Figure 3:
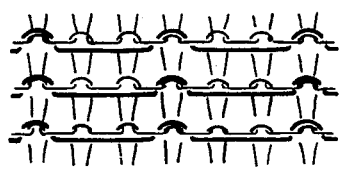
Figure 4:
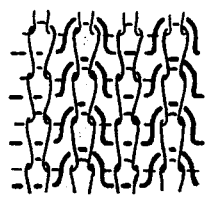

FIG. 3 purl fabric with alternating floating and tied-in additional weft threads and FIG. 4 another type of knitted fabric with additional weft threads.

FIGS. 1 and 2 of the drawing demostrate a regular purl fabric while the additional weft threads (see the intensive line of the drawing) are running straight through and alternatingly lying above and below the neighboring loops and thereby tied-in the knitted fabric.

The embodiment of FIG. 3 demonstrates a purl fabric with additional floating weft threads (see intensive line). These floating weft threads are tied-in with each third loop without participating in the forming of the loops as such.

FIG. 4 demonstrates a regular purl fabric in which the (intensively drawn) weft threads are running alternating behind the upper part of a loop and in front of the lower part of the tied-in next higher loop and then behind the upper part of the neighboring next higher loop.

For better demonstration, the weft threads are drawn excessively loose.

By pulling in circumferential direction, the weft thread will be stretched. The same is valid for the example of FIG. 3.

As will be apparent to persons skilled in the art, various modifications, adaptations and variations of the foregoing specific disclosure can be made without departing from the teachings of the present invention.

I claim:

1. In a tubular sausage casing providing a sausage skin for containing sausage therein comprising a reinforcing tubular base fabric and a coating in interlocking association therewith and together providing said sausage skin, the improvement wherein the tubular base fabric comprises a tubular textile knitted fabric of knitted threads and additional weft threads running in a direction extending generally circumferentially of the tubular fabric and thereby to extend generally circumferentially about the sausage within the sausage skin, said additional weft threads having a strength related to the strength of the knitted threads for eaay circumferential tearing of the knitted threads of the sausage skin with said additional weft threads for permitting selective manual removal of sections of the sausage skin by selectively manually tearing the sausage skin from the sausage.

2. A casing for sausage according to claim 1 wherein the textile knitted fabric coating has a resiliency at least equal to the resiliency of said additional weft threads in said running direction thereof.

3. A casing for sausage according to claim 1 wherein the textile knitted fabric formed of said knitted threads has knitted loop sizes between 0.2 to 2.0 square millimeters.

4. A casing for sausage according to claim 1 wherein said weft threads provide greater strength in said circumferential direction than said threads forming the knitted fabric.

5. A casing for sausage according to claim 1 wherein the tubular is a knitted tubular seamless fabric.

6. A casing for sausage according to claim 1 wherein the said additional weft threads are made of synthetic material.

* * * * *